(12) United States Patent  
Challener

(10) Patent No.: US 7,272,079 B2
(45) Date of Patent: Sep. 18, 2007

(54) TRANSDUCER FOR HEAT ASSISTED MAGNETIC RECORDING

(75) Inventor: William Albert Challener, Sewickley, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 701 days.

(21) Appl. No.: 10/874,457

(22) Filed: Jun. 23, 2004

(65) Prior Publication Data

US 2005/0289576 A1 Dec. 29, 2005

(51) Int. Cl.
*G11B 11/00* (2006.01)

(52) U.S. Cl. .............................. 369/13.17; 369/13.13; 360/59; 720/658

(58) Field of Classification Search ............. 369/13.17, 369/13.13, 13.32, 13.33, 112.23, 112.24, 369/44.23; 360/59, 128; 720/658; 359/824, 359/664, 368
See application file for complete search history.

(56) References Cited

U.S. PATENT DOCUMENTS

| | | | |
|---|---|---|---|
| 4,917,462 A | 4/1990 | Lewis et al. |
| 4,947,034 A | 8/1990 | Wickramasinghe et al. |
| 4,994,818 A | 2/1991 | Keilmann |
| 5,004,307 A | 4/1991 | Kino et al. |
| 5,121,256 A | 6/1992 | Corle et al. |
| 5,125,750 A | 6/1992 | Corle et al. |
| 5,272,330 A | 12/1993 | Betzig et al. |
| 5,286,970 A | 2/1994 | Betzig et al. |
| 5,286,971 A | 2/1994 | Betzig et al. |
| 5,602,820 A | 2/1997 | Wickramasinghe et al. |
| 5,664,036 A | 9/1997 | Islam |
| 5,883,872 A | 3/1999 | Kino |
| 5,930,434 A | 7/1999 | Mowry et al. |
| 5,982,716 A | 11/1999 | Kino et al. |
| 6,043,940 A | 3/2000 | Kamiyama et al. |
| 6,055,220 A | 4/2000 | Mamin et al. |
| 6,091,694 A | 7/2000 | Späth |
| 6,275,453 B1 | 8/2001 | Ueyanagi et al. |
| 6,298,026 B1 | 10/2001 | Suzuki et al. |
| 6,320,708 B1 | 11/2001 | Ueyanagi et al. |
| 6,396,776 B1 | 5/2002 | Ueyanagi |
| 6,408,123 B1 | 6/2002 | Kuroda et al. |
| 6,473,385 B1 | 10/2002 | Saito |
| 2001/0004348 A1 | 6/2001 | Ueyanagi |
| 2001/0009541 A1 | 7/2001 | Ueyanagi |
| 2002/0056816 A1 | 5/2002 | Stark |

(Continued)

FOREIGN PATENT DOCUMENTS

EP 1128372 A2 8/2001
JP 2001-256664 9/2001

OTHER PUBLICATIONS

*Patent Abstracts of Japan*, JP 2001-256664, Hitachi Ltd., Sep. 21, 2001.

(Continued)

*Primary Examiner*—Ali Neyzari
(74) *Attorney, Agent, or Firm*—Robert P. Lenart, Esq.; Pietragallo Bosick & Gordon, LLP

(57) ABSTRACT

An apparatus for concentrating electromagnetic energy comprises a metallic transducer including a first section and a second section, wherein the first section is wider than the second section and has a width to length aspect ratio greater than or equal to a width to length aspect ratio of the second section, and a condenser for directing electromagnetic radiation onto the transducer. A magnetic storage device that includes the apparatus is also provided.

20 Claims, 12 Drawing Sheets

U.S. PATENT DOCUMENTS

| | | |
|---|---|---|
| 2002/0080709 A1 | 6/2002 | Park et al. |
| 2002/0114567 A1 | 8/2002 | Novotny et al. |
| 2003/0112542 A1 | 6/2003 | Rettner et al. |
| 2003/0128633 A1 | 7/2003 | Batra et al. |
| 2003/0128634 A1 | 7/2003 | Challener |
| 2003/0137772 A1 | 7/2003 | Challener |
| 2003/0184903 A1 | 10/2003 | Challener |
| 2004/0001394 A1 | 1/2004 | Challener et al. |
| 2004/0001420 A1 | 1/2004 | Challener |
| 2004/0008591 A1 | 1/2004 | Johns et al. |
| 2005/0078565 A1* | 4/2005 | Peng et al. ............... 369/13.32 |
| 2005/0135008 A1* | 6/2005 | Challener et al. ........... 360/128 |
| 2006/0077787 A1* | 4/2006 | Itagi et al. ................ 369/44.23 |
| 2006/0133230 A1* | 6/2006 | Buechel et al. .......... 369/44.23 |

OTHER PUBLICATIONS

S. M. Mansfield et al., "Solid Immersion Microscope," *Appl. Phys. Lett*, vol. 57, No. 24, Dec. 10, 1990, pp. 2615-2616.

B. D. Terris et al., "Near-Field Optical Data Storage Using A Solid Immersion Lens," *Appl. Phys. lett*, vol. 65, No. 4, Jul. 25, 1994, pp. 388-390.

Y. Martin et al., "Optical Data Storage Read Out at 256 Gbits/in$^2$," *Appl. Phys. Lett.*, vol. 71, No. 1, Jul. 7, 1997, pp. 1-3.

H. F. Ghaemi et al., "Surface Plasmons Enhance Optical Transmission Through Subwavelength Holes", *Physical Review B*, vol. 58, No. 11, Sep. 15, 1998, pp. 6779-6782.

K. Ueyanagi et al., "Proposal of a Near-Field Optical Head Using a New Solid Immersion Mirror," *Jpn. J. Appl. Phys.*, vol. 39, Part 1, No. 2B, Feb. 2000, pp. 888-891.

Y.-J. Kim et al., "Fabrication of Micro-Pyramidal Probe Array with Aperture for Near-Field Optical Memory Applications," *Jpn. J. Appl. Phys.*, vol. 39, Part 1, No. 3B, Mar. 2000, pp. 1538-1541.

S. Quabis et al., "Focusing Light to a Tighter Spot," *Optics Communications*, vol. 179, May 25, 2000, pp. 1-7.

R. Coehoorn et al., "Hybrid Recording," *Magnetic Storage Systems Beyond 2000*, Proceedings of the NATO-ASI on Rhodes (Greece), Jun. 2000, pp. 1-17.

T. D. Milster et al., "Super-Resolution by Combination of a Solid Immersion Lens and an Aperture," *Jpn. J. Appl. Phys.*, vol. 40, Part 1, No. 3B, Mar. 2001, pp. 1778-1782.

Y.-J. Kim et al., "Parallel Recording Array Head of Nano-Aperture Flat-Tip Probes for High-Density Near-Field Optical Data Storage," *Jpn. J. Appl. Phys.*, vol. 40, Part 1, No. 3B, Mar. 2001, pp. 1783-1789.

Y. C. Martin et al., "Strength of the Electric Field in Apertureless Near-Field Optical Microscopy," *Journal of Applied Physics*, vol. 89, No. 10, May 15, 2001, pp. 5774-5778.

H. Hatano et al., "Plano-Convex Solid Immersion Mirror with a Small Aperture for Near-Field Optical Data Storage," *Optical Review*, vol. 9, No. 2, Feb. 4, 2002, pp. 66-69.

T. E. Schlesinger et al., "An Integrated Read/Write Head for Hybrid Recording," *Jpn. J. Appl. Phys.*, vol. 41, Part 1, No. 3B, Mar. 2002, pp. 1821-1824.

K. Goto et al., "Microoptical Two-Dimensional Devices for the Optical Memory Head of an Ultrahigh Data Transfer Rate and Density System Using a Vertical Cavity Surface Emitting Laser (VCSEL) Array," *Jpn. J. Appl. Phys.*, vol. 41, Part 1, No. 7B, Jul. 2002, pp. 4835-4840.

B. B. Goldberg et al., "Immersion Lens Microscopy of Photonic Nanostructures and Quantum Dots," *IEEE Journal of Selected Topics in Quantum Electronics*, vol. 8, No. 5, Sep./Oct. 2002, pp. 1051-1059.

A. Hartschuh et al., "High-Resolution Near-Field Raman Microscopy of Single-Walled Carbon Nanotubes," *Physical Review Letters*, vol. 90, No. 9, Mar. 7, 2003, 4 pages.

C. W. Lee et al., "Feasibility Study On Near Field Optical Memory Using A Catadioptric Optical System," Samsung Electronics Co., Ltd., Korea, pp. WA4-1/137-WA4-3/139.

* cited by examiner

TRANSDUCER FOR HEAT ASSISTED MAGNETIC RECORDING

STATEMENT REGARDING FEDERALLY SPONSORED RESEARCH OR DEVELOPMENT

This invention was made with the United States Government support under Agreement No. 70NANB1H3056 awarded by the National Institute of Standards and Technology (NIST). The United States Government has certain rights in the invention.

FIELD OF THE INVENTION

This invention relates to transducers for concentrating electromagnetic energy, and more particularly to such transducers for use in heat assisted magnetic recording.

BACKGROUND OF THE INVENTION

Heat assisted magnetic recording (HAMR) has been proposed as a means by which the recording density of hard disc drives may be extended to 1 Tb/in$^2$ or higher. Current conventional hard disc drive technology is limited by the superparamagnetic limit, which causes the small magnetic grains needed for high density recording media to gradually lose their magnetization state over time due to thermal fluctuations. By using heat assisted magnetic recording, the magnetic anisotropy of the recording medium, i.e. its resistance to thermal demagnetization, can be greatly increased while still allowing the data to be recorded with standard recording fields. A laser beam heats the area on the disc that is to be recorded and temporarily reduces the anisotropy in just that area sufficiently so that the applied recording field is able to set the magnetic state of that area. After cooling back to the ambient temperature, the anisotropy returns to its high value and stabilizes the magnetic state of the recorded mark.

The main difficulty with HAMR has been discovering a technique that is able to conduct sufficient light energy into the recording medium to heat it by several hundred degrees, but only in the area that is desired to be recorded, which typically will have dimensions on the order of 25 to 50 nm if the recording density is 1 Tb/in$^2$. If the optical hot spot is larger than this area, it will extend to neighboring bits and tracks on the disc, and by heating those areas as well, the data recorded in those areas will be erased. Confining the optical spot to an area that is much smaller than a wavelength of light, and well below the so-called "diffraction limit" that can be achieved by standard focusing lenses, is an area of study called "near field optics" or "near field microscopy." Techniques have been described in the literature for confining light to 20 nm spots or smaller. However, these techniques have not demonstrated a capability for delivering a substantial amount of optical power to the sample within that small spot.

U.S. Published Patent Application No. 2004/0001394 A1 described a technique for delivering a large amount of optical energy into a spot of 50 nm diameter or smaller which would be suitable for HAMR. However, it would still be desirable to increase the efficiency of coupling light energy into the recording medium in order to improve manufacturing margins and enhance disc drive performance.

This invention provides a transducer design that theoretically provides improved coupling efficiency.

SUMMARY OF THE INVENTION

This invention provides an apparatus for concentrating electromagnetic energy comprising a metallic transducer including a first section and a second section, wherein the first section is wider than the second section and has a width to length aspect ratio greater than or equal to a width to length aspect ratio of the second section, and a condenser for directing electromagnetic radiation onto the transducer.

In another aspect, the invention encompasses a magnetic storage device comprising a magnetic storage medium, an arm for positioning a magnetic recording head adjacent to the magnetic storage medium, and an apparatus mounted adjacent to the magnetic recording head, the apparatus comprising a metallic transducer including a first section and a second section, wherein the first section is wider than the second section and has a width to length aspect ratio greater than or equal to a width to length aspect ratio of the second section, and a condenser for directing electromagnetic radiation onto the transducer.

DETAILED DESCRIPTION OF THE INVENTION

Figure 1:
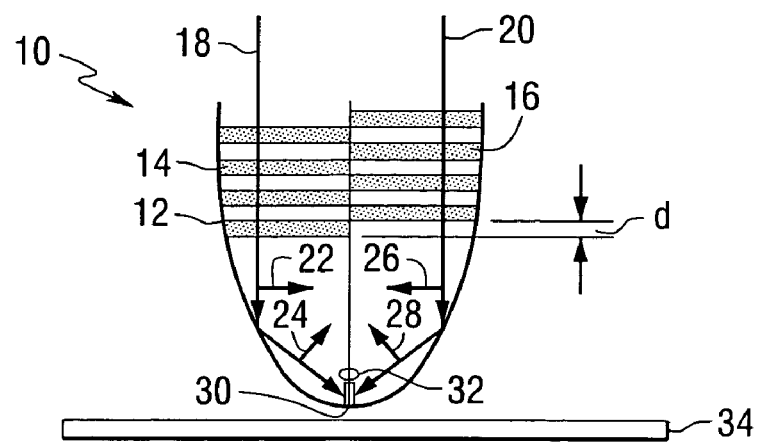
FIG. 1 is a schematic representation of an apparatus constructed in accordance with this invention.

Referring to the drawings, FIG. 1 is a schematic representation of an apparatus 10 constructed in accordance with this invention. The apparatus includes a planar waveguide shaped in the form of a parabolic mirror (also called a condenser) 12. A first grating 14 and a second grating 16 form a split grating for coupling incident light into a waveguide. Electromagnetic radiation in the form of polarized light, illustrated by arrows 18 and 20 is directed onto the gratings. The gratings are offset by a distance, d, so that the coupled light enters the waveguide with a 180° phase shift between the two halves of the grating. Arrows 22, 24, 26 and 28 illustrate the electric field of the light. The sides of the waveguide are shaped such that the light is brought to a focus at a focal point 30. A metallic transducer 32 is positioned at the focal point. The transducer is preferably made of a metal such as gold, silver, aluminum, or copper.

In FIG. 1, the condenser is a planar solid immersion mirror (P-SIM). At the focal point, the offset grating causes the electric field of the light to be polarized in the longitudinal direction which is along the axis of symmetry of the condenser. The longitudinal electric field couples strongly to the transducer when it is oriented in the same direction as shown in FIG. 1. The transducer is positioned adjacent to a magnetic recording medium 34, such that electromagnetic radiation emitted at the end of the transducer can be used to heat a portion of the recording medium. If the transducer is chosen with the correct dimensions, particularly the correct length, then it resonates with the incident light and creates extremely large electric fields in a recording medium in the vicinity of the end of the transducer.

Of course, the parabolic planar waveguide of FIG. 1 is not the only type of condenser that could be used. For example, a planar (that is two-dimensional) mode index lens would also work as long as the phase of the incident beam of light was chosen to give the correct polarization at the focus.

Figure 2:
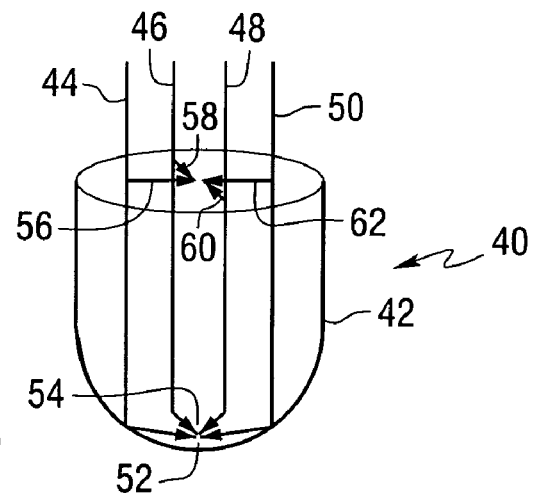
FIG. 2 is a schematic representation of another apparatus constructed in accordance with this invention.

Although the apparatus of FIG. 1 is shown in a planar waveguide geometry, a related apparatus design uses a fully three-dimensional solid immersion mirror (3D SIM) or a three-dimensional solid immersion lens (3D SIL). As used herein, the term condenser encompasses both planar and three-dimensional structures, including SIMs and SILs. An example of an apparatus containing a three-dimensional condenser is shown in FIG. 2. FIG. 2 shows an apparatus 40, wherein the condenser 42 is a three-dimensional parabolic solid immersion mirror. In this case the incident light, illustrated by arrows 44, 46, 48 and 50 is radially polarized in order to generate a longitudinal electric field at the focus 52 for coupling to the transducer 54. Arrows 56, 58, 60 and 62 represent the electric field component of the incident electromagnetic wave.

At the focal point 52, the electric field of the radially polarized light is positioned in the longitudinal direction which is along the axis of symmetry of the condenser. The longitudinal electric field couples strongly to the transducer when it is oriented in the same direction as shown in FIG. 2. The transducer is positioned adjacent to a magnetic recording medium, such that electromagnetic radiation emitted at the end of the transducer can be used to heat a portion of the recording medium. If the transducer is chosen with the correct dimensions, particularly the correct length, then it resonates with the incident light and creates extremely large electric fields in a recording medium in the vicinity of the end of the transducer.

Figure 3:
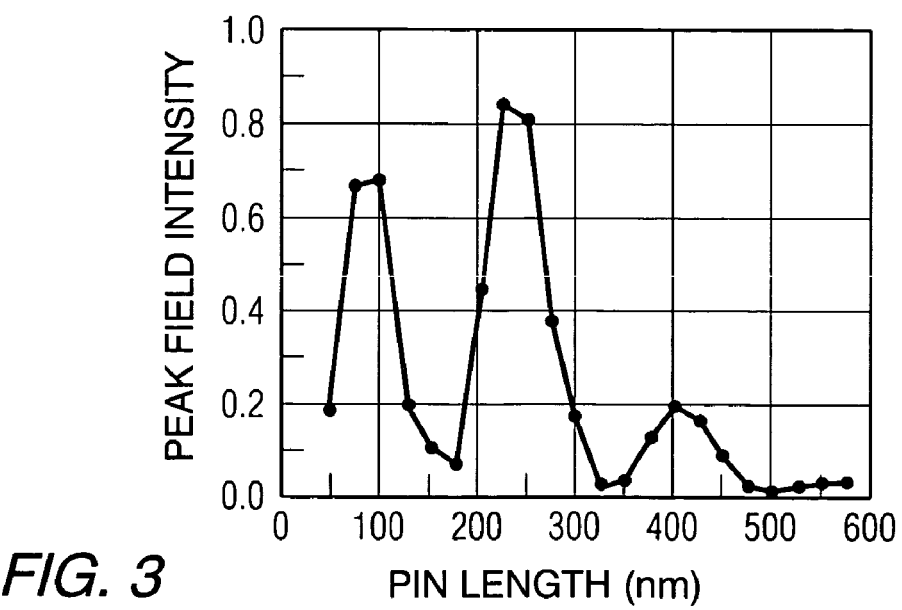
FIG. 3 is a graph of electric field intensity versus pin length.

To illustrate this, the finite difference time domain (FDTD) technique has been used to compute the field intensity within a recording medium that is situated 10 nm below the transducer as a function of transducer length as shown in FIG. 3. The data in FIG. 3 were calculated assuming that the transducer is a gold pin which is a right circular cylinder with a diameter of 50 nm. The incident radially polarized, focused beam has a wavelength of 830 nm. The variation of the field intensity with pin length is due to the localized surface plasmon resonance effect. In this example, in order to maximize the coupling efficiency to the recording medium, the pin length should be chosen to be either about 100 nm or about 225 nm.

Figure 4:
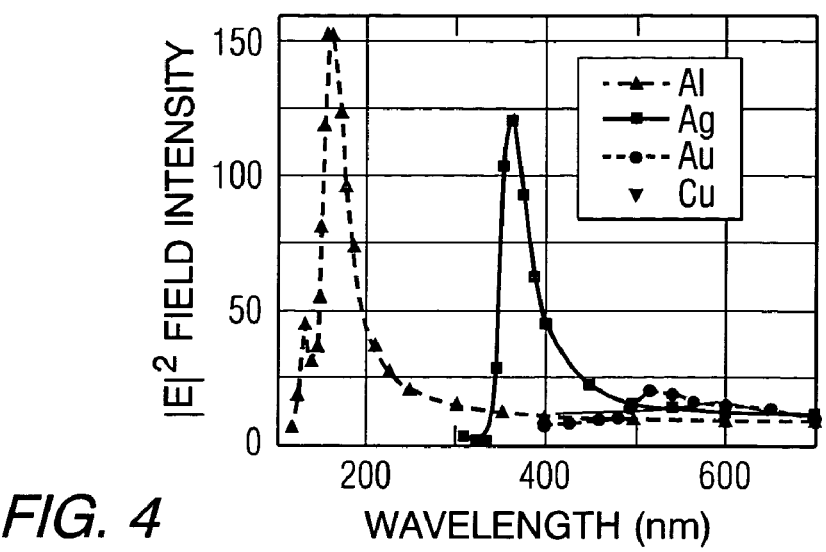
FIG. 4 is a graph of electric field intensity versus wavelength for several spherical particles.

Even if the pin length has been chosen to maximize the coupling efficiency, that does not mean that the pin is resonating as efficiently as possible. It is well-known that spherical metallic particles in free space have specific resonant wavelengths depending on the optical indices of the metal and the diameter of the particles. Mie theory can be used to solve for the electric field intensity scattered from a spherical particle. FIG. 4 shows the field intensity vs. wavelength for a spherical particle transducer constructed of several different metals. It is clear that there is a resonance at a specific wavelength for each metal at which the field intensity is maximized. This is known as a localized surface plasmon resonance.

Figure 5:
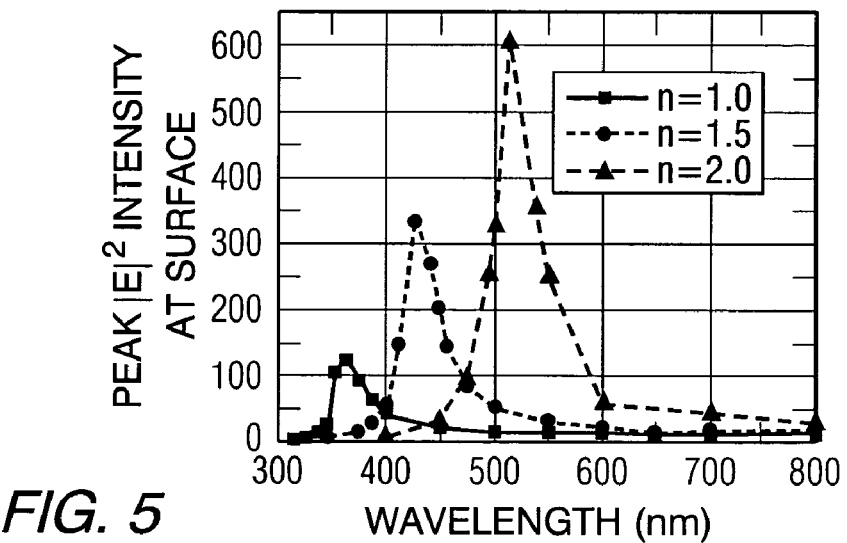
FIG. 5 is a graph of electric field intensity versus wavelength for a spherical particle in material having several dielectric indices.

FIG. 4 shows the electric field intensity $|E|^2$ at the edge of a 30 nm sphere comprised of different metals as a function of wavelength. If the refractive index of the surrounding medium is increased from that of free space, the wavelength of the resonance also changes as shown in FIG. 5. As the refractive index increases, the resonance wavelength shifts towards longer wavelengths. As a result, the resonance is shifted to longer wavelengths from the resonant wavelength of a pin surrounded by free space.

In the case of an apparatus designed in accordance with this invention, the transducer is embedded within a high index dielectric medium that comprises either a three-dimensional SIM or SIL, or the core of a waveguide for a planar SIM or SIL.

Figure 6:
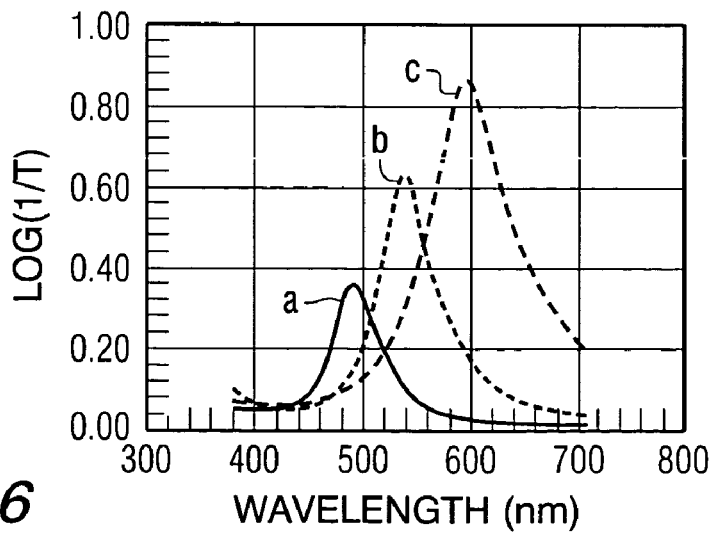
FIG. 6 is a graph of extinction spectra versus wavelength for prolate spheroids.

The transducer shape has a strong effect on the resonant wavelength. The transducers used in this invention are not spherical in shape. Mie theory can be solved for the oblate and prolate spheroid cases, i.e. the sphere which is "squashed" or the sphere which is pulled out and "elongated." FIG. 6 shows the extinction spectra of prolate spheroids for incident light having a polarization parallel to the long axis of the particle. The aspect ratio is 1.64 for curve (a), 2.05 for curve (b) and 2.50 for curve (c). FIG. 6 was taken from W. Gotschy, K. Vonmetz, A. Leitner, and F. R. Aussenegg, Opt. Lett. 21 (1996) 1099. As shown in FIG. 6, elongating the sphere to make it more similar to a pin has the effect of shifting the resonance to longer wavelengths.

For a transducer design with a cylindrical gold pin in a three-dimensional SIM or P-SIM, the optimum resonant wavelength has been shifted to >900 nm by the combined effects of the pin shape and waveguide index. Operating this transducer at 830 nm is, therefore, not the optimum situation even when the pin length is optimized.

One approach to operating the transducer at its optimum resonance would be to change the input laser wavelength to the resonance wavelength of the transducer. However, there are several problems with changing the laser wavelength to >900 nm. First, the condenser, whether it is a 3D SIM, 3D SIL, P-SIM, or P-SIL, can only concentrate the light to the diffraction limit, which scales directly with wavelength.

When the wavelength is increased, the size of the focused spot in the condenser also increases and the electric field intensity at the focal point decreases. Second, the recording medium is typically a lossy metal like CoPt deposited on top of a good metallic heat sink like gold. At longer wavelengths the penetration depth of the external field into the recording medium decreases, because the dielectric constants of the metallic layers in the medium become more effective at shielding the external field from the interior of the recording medium. This also reduces the efficiency of coupling energy into the medium. Finally, laser diodes developed for the optical data storage industry operate at typical wavelengths of 635 nm, 650 nm, 680 nm, 780 nm and 830 nm. High power and low cost diode lasers are available at these wavelengths.

While it is true that there are laser diodes developed for the telecom industry which operate at 1330 nm and 1550 nm, these lasers are usually more expensive and these long wavelengths are not preferable for reasons previously stated. Therefore, ideally the transducer shape should be modified so that the optimum resonant wavelength is near that of commercial laser diodes in the optical disk drive industry.

When the spheroid is either prolate or oblate and the incident light is polarized parallel to the major axis, the resonance shifts towards longer wavelengths as the ratio of the length of the major axis to the minor axis increases. When the spheroid is prolate or oblate and the incident light is polarized parallel to a minor axis, the resonance shifts towards shorter wavelengths as the aspect ratio increases. However, in this case the coupling efficiency of the incident light to the spheroid is reduced. Therefore, there is a trade off in choosing the correct degree of prolateness or oblateness to maximize the total coupling efficiency of the transducer to the recording medium for a specific incident light wavelength that takes into account both the resonance wavelength and the coupling efficiency.

Figure 7:
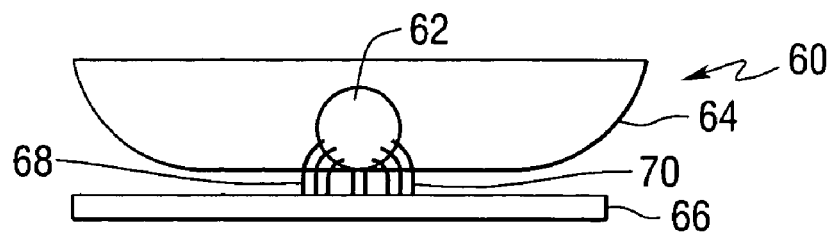
FIG. 7 is a schematic representation of a spherical particle transducer.

As a compromise between these competing demands, the spherical shape was chosen as the prototypical shape for modeling in this invention, although in practice when a set of materials and a laser wavelength have been chosen, a spheroid of some degree of oblateness or prolateness may be better. The spherical shape will reduce the resonance wavelength from that of a pin, shifting it closer to the wavelengths of high power and low cost laser diodes. FIG. 7 shows a transducer 60 having a spherical particle 62 at the focal point of a condenser 64. However, putting a sphere at the focus of the condenser as shown in FIG. 7 will not result in a good transducer or efficient coupling to the recording medium 66. There are two reasons for this. First, the pin shape, by virtue of its high aspect ratio, concentrates the field intensity at its tip via the "lightning rod effect" even when the pin is not operating at resonance. A sphere does not have a point anywhere at which the field intensity can be concentrated. Second, the surface of the sphere remains close to the recording medium over a rather large area, so the coupled spot size becomes very large as shown by the field lines 68 and 70 in FIG. 7.

Figure 8:
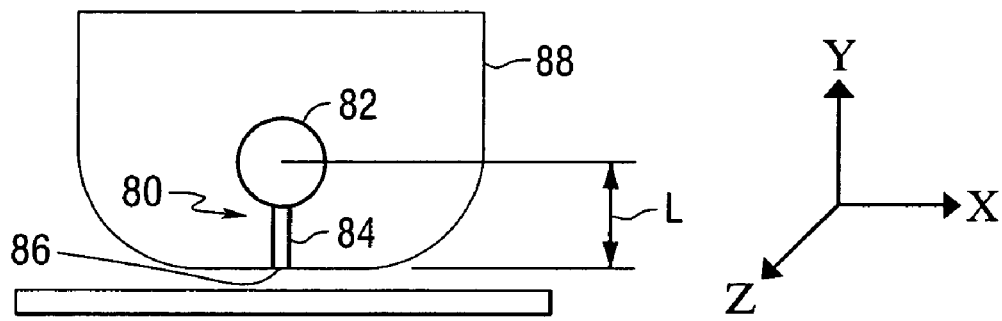
FIG. 8 is a schematic representation of an apparatus constructed in accordance with this invention.

In order to combine both the advantages of the spherical shape for shifting the resonance to shorter wavelengths as well as the elongated shape of the pin to make use of the lightning rod effect and to confine the spot size, this invention uses a transducer 80 having a first section 82 with a spherical or spheroidal shape and a second section 84, referred to as a pin, and having an elongated or rod shape as shown in FIG. 8.

In general, the top section should be larger than the pin in both length and width. Preferably, the top section should include a curved surface to avoid any points that would concentrate the field energy, which would tend to enhance energy loss through interaction with the rest of the condenser/waveguide. However, a curved surface is not strictly necessary, see FIG. 16b. A primary characteristic is the aspect ratio of the width to length of the transducer section. For the pin, the aspect ratio is always less than or equal to 1 and typically less than 0.5. For the sphere, the aspect ratio is 1. An aspect ratio of 0.5 to 2.0 is the preferable range for the top section of the transducer.

In the FIGS., width is measured in the x direction, length is measured in the y direction, and height is measured in the z direction. The width of the top (first) section of the transducer is wider than the width of the bottom (second) section.

Figure 9A:
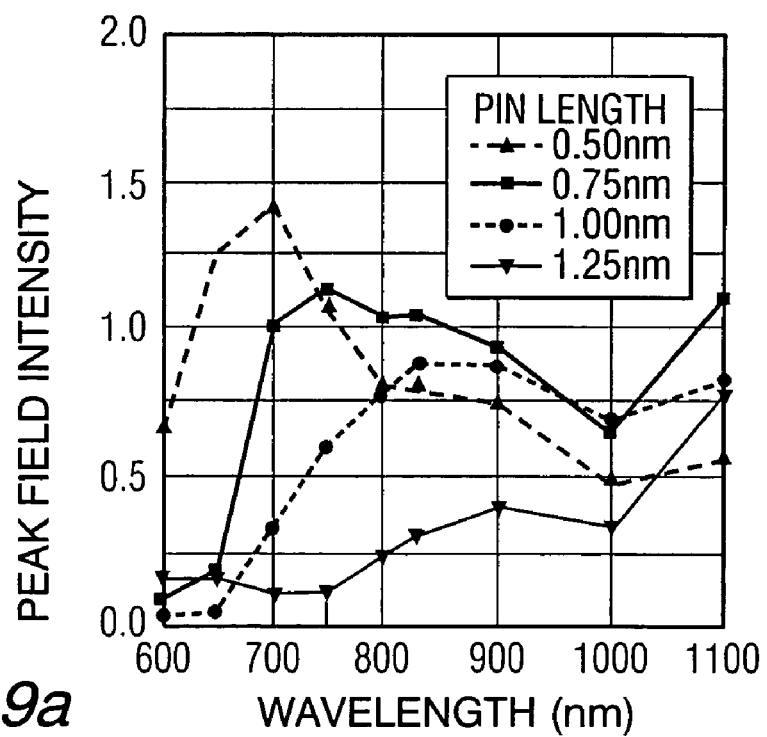
FIGS. 9a, 9b, 9c and 9d are graphs of electric field intensity versus wavelength for several pin configurations.
Figure 9B:
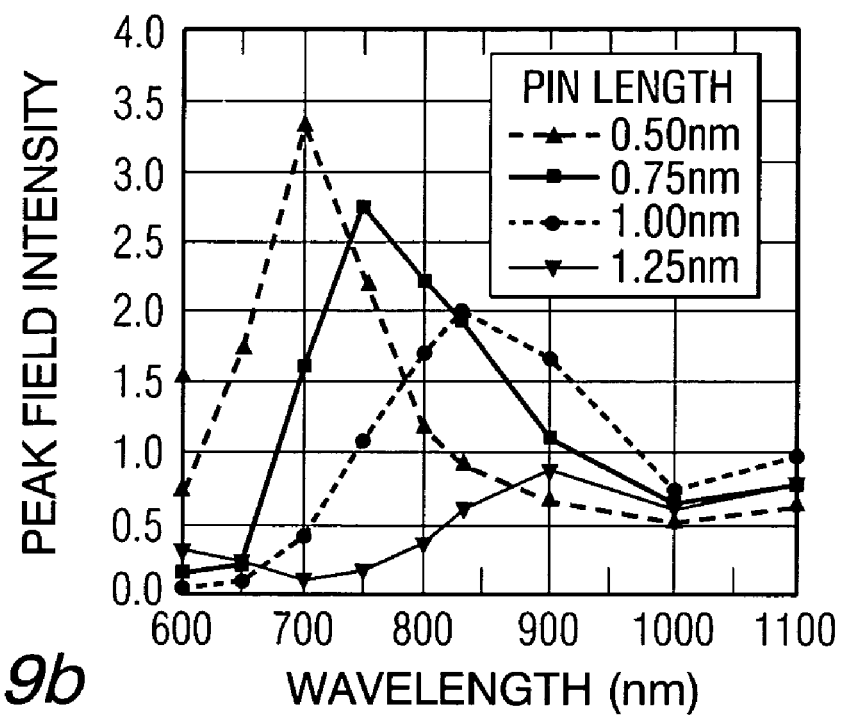
Figure 9C:
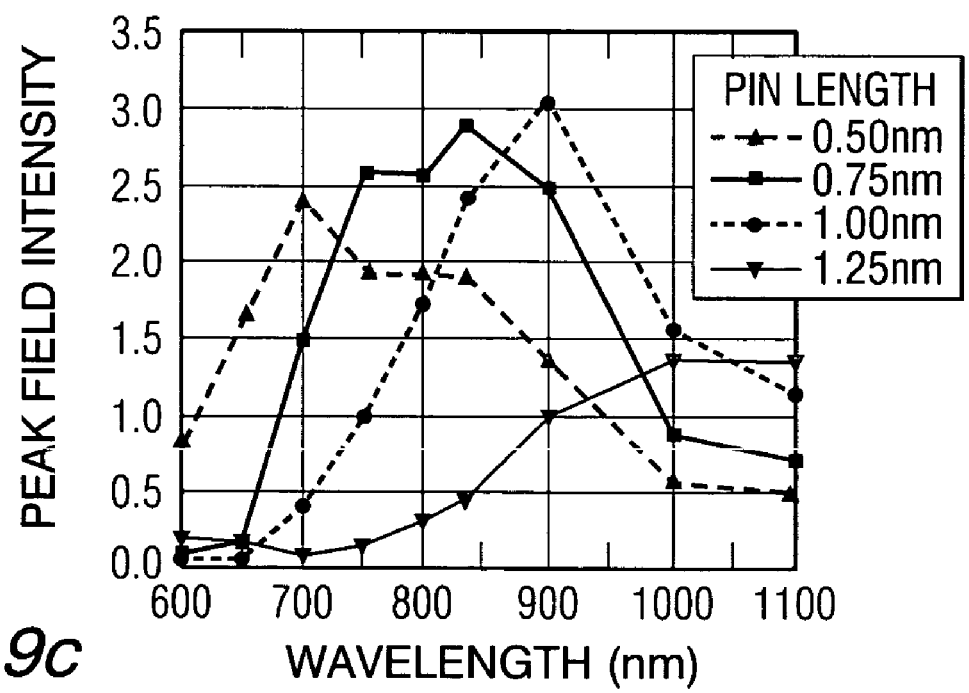
Figure 9D:
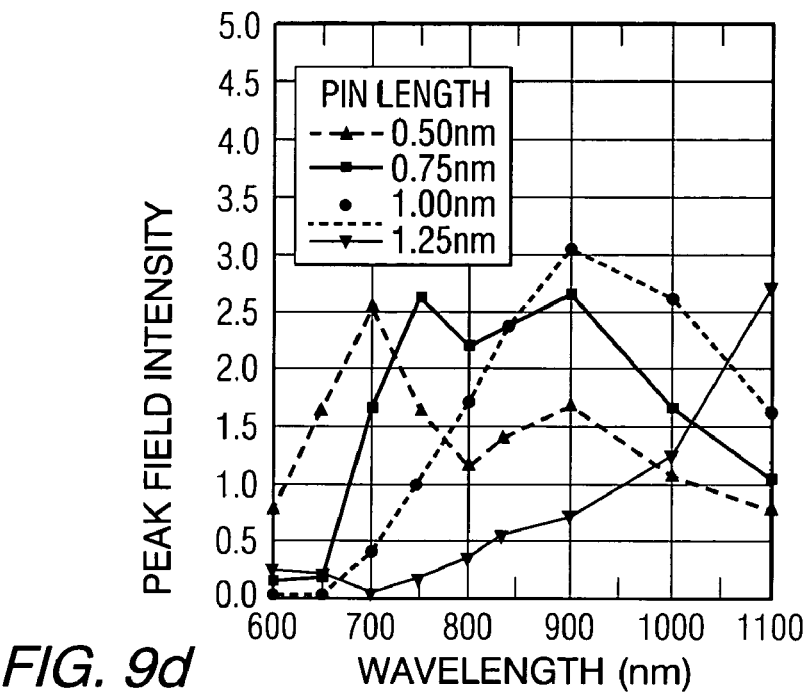

The FDTD technique was used to study the shape of the transducer of FIG. 8, wherein the first section is a sphere and the second section is a rod. Calculations were carried out for various sphere diameters, pin lengths, and wavelengths. FIGS. 9a, 9b, 9c and 9d show the peak electric field intensity vs. wavelength for various sphere diameters and pin lengths. The pin length is defined as the distance L from the center of the sphere to the bottom edge 86 of the condenser 88. The data in FIGS. 9a and 9b are based on a gold transducer. For FIG. 9a, a 125 nm diameter sphere was assumed. For FIG. 9b, a 175 nm sphere was assumed. In FIGS. 9c and 9d, the sphere diameter was assumed to be 225 and 275 nm, respectively.

Figure 10A:
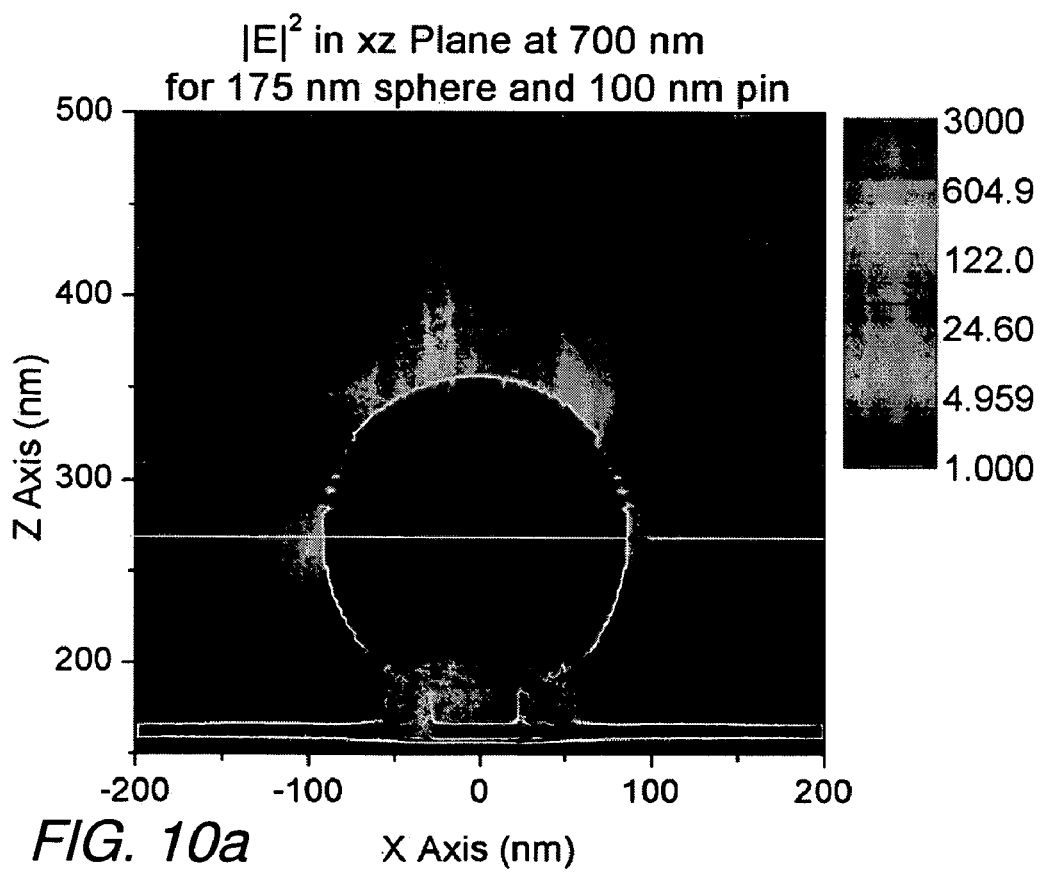
FIG. 10a is a representation of the calculated electric field intensity perpendicular to the plane of a recording medium.
Figure 10B:
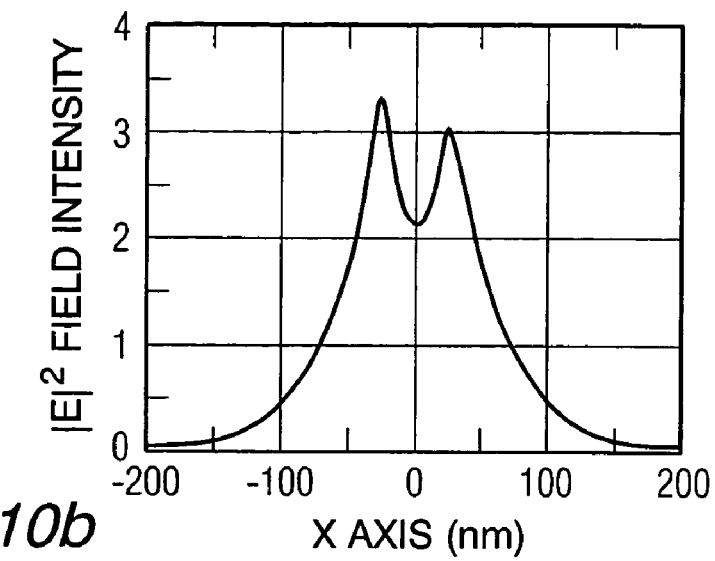
FIG. 10b is a graph of the calculated electric field intensity in a recording medium.

For each different sphere and pin length, there is clearly a resonant peak at a specific wavelength. As a specific example, consider the peak at 700 nm for the 175 nm sphere with a 100 nm pin length. The FDTD results for this case are shown in FIGS. 10a and 10b. FIG. 10a shows the field intensity in focal plane perpendicular to the plane of the recording medium and FIG. 10b shows a cross section of the field intensity in the recording medium.

The peak field intensity in the medium under the pin is about 3.4 times the incident field intensity. From FIG. 3, the peak intensity for a cylindrical pin alone was about 0.85 times the incident field intensity. Therefore, the resonance peak can be increased by about a factor of 4, by using transducers constructed in accordance with this invention. Moreover, the resonance wavelength has been shifted from 830 nm down to 700 nm, which is preferable because the light can be focused by the condenser to a smaller spot at the shorter wavelength which thereby increases the incident field intensity on the transducer and will further enhance the power coupled into the recording medium.

Figure 11:
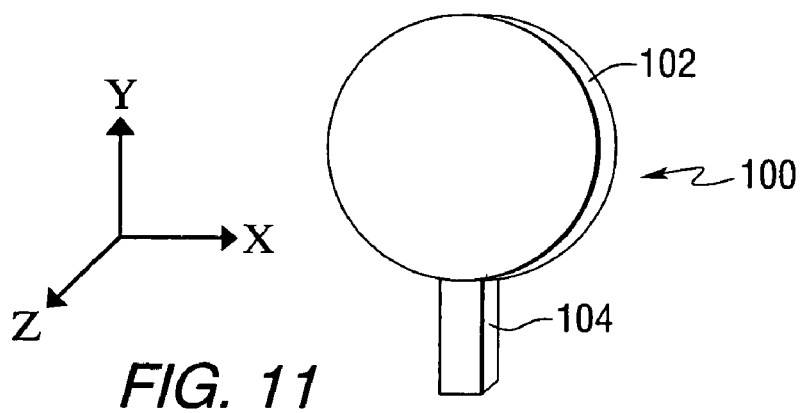
FIG. 11 is a schematic representation of a transducer constructed in accordance with this invention.

Although the results in FIGS. 9a-9d and 10 are for the three-dimensional condenser and a rotationally symmetric transducer, the same principle can be applied to the waveguide condenser/transducer combination of FIG. 1. FIG. 11 shows the combination disk and pin transducer design for waveguide condensers. In that case, however, the transducer 100 will be comprised of a disk 102 attached to a pin 104 with a rectangular cross section as shown in FIG. 11.

Figure 12:
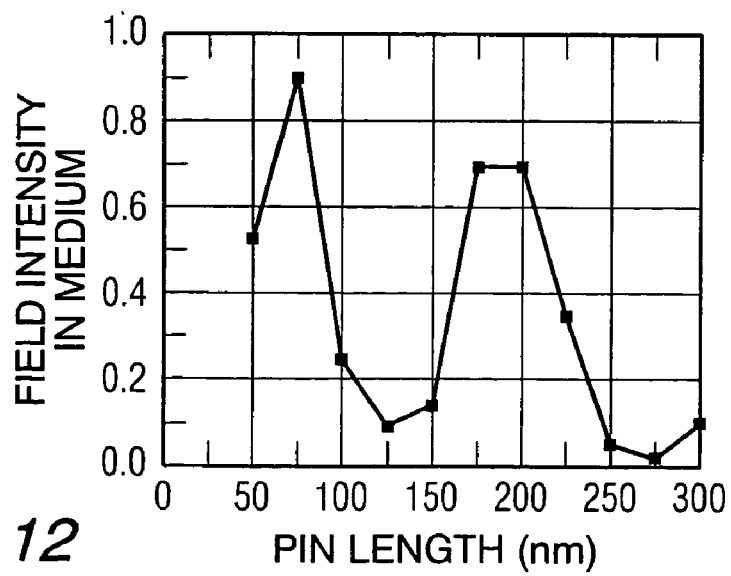
FIG. 12 is a graph of electric field intensity versus pin length.

In FIG. 12 the field intensity within the recording medium is plotted for a transducer in the form of a rectangular gold pin in the waveguide at 830 nm wavelength as a function of pin length. The pin cross section is 50 nm square.

It is again apparent that there are optimum pin lengths for maximum coupling efficiency. However, if a disk is attached to the top of the pin such that the disk lies in the plane of the waveguide, then further improvements in coupling efficiency are possible. To optimize this transducer, the coupling efficiency has been computed as a function of disk radius and pin length.

Figure 13:
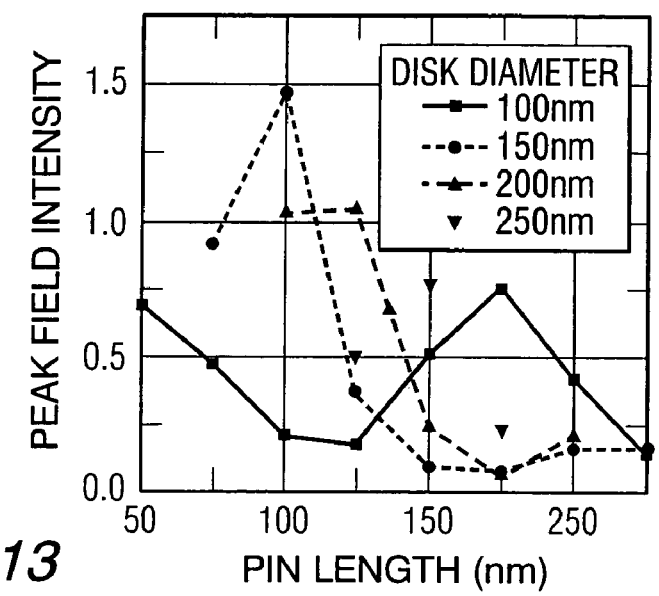
FIG. 13 is a graph of electric field intensity versus pin length for several disk diameters.

FIG. 13 shows the field intensity in the recording medium as a function of pin length plotted for various disk diameters. The pin and disk are both gold and are located in a waveguide which consists of a 125 nm thick $Ta_2O_5$ core layer surrounded by silica cladding layers. A pin length of 100 nm and a disk diameter of 150 nm generate a peak field intensity within the recording medium of 1.5 times the incident field at a wavelength of 830 nm, which is nearly twice as large as that of the pin alone as shown in FIG. 12.

Further improvements can be made to the transducer designs of FIGS. 8 and 11. In particular, the pin could be tapered to a sharper point. This will enhance the confinement of the optical spot in the recording medium. Moreover, the thickness of the disk need not be the same as that of the pin. Making a thicker disk can enhance the coupling of the transducer to the incident focused light, but keeping the pin the same size will ensure that the light confinement does not change substantially.

Figure 14A:
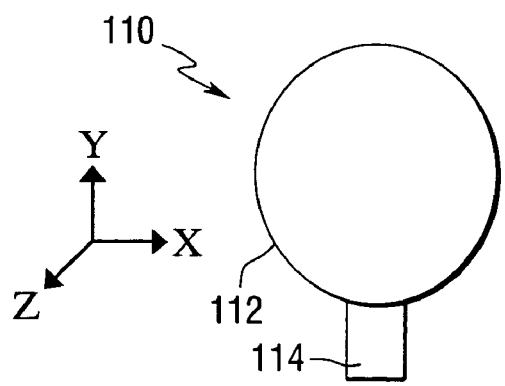
FIGS. 14a and 14b are schematic representations of another transducer constructed in accordance with this invention.
Figure 14B:
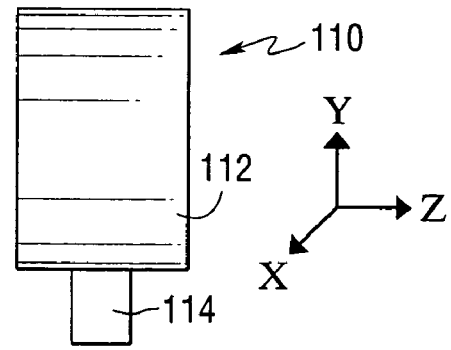
Figure 15A:
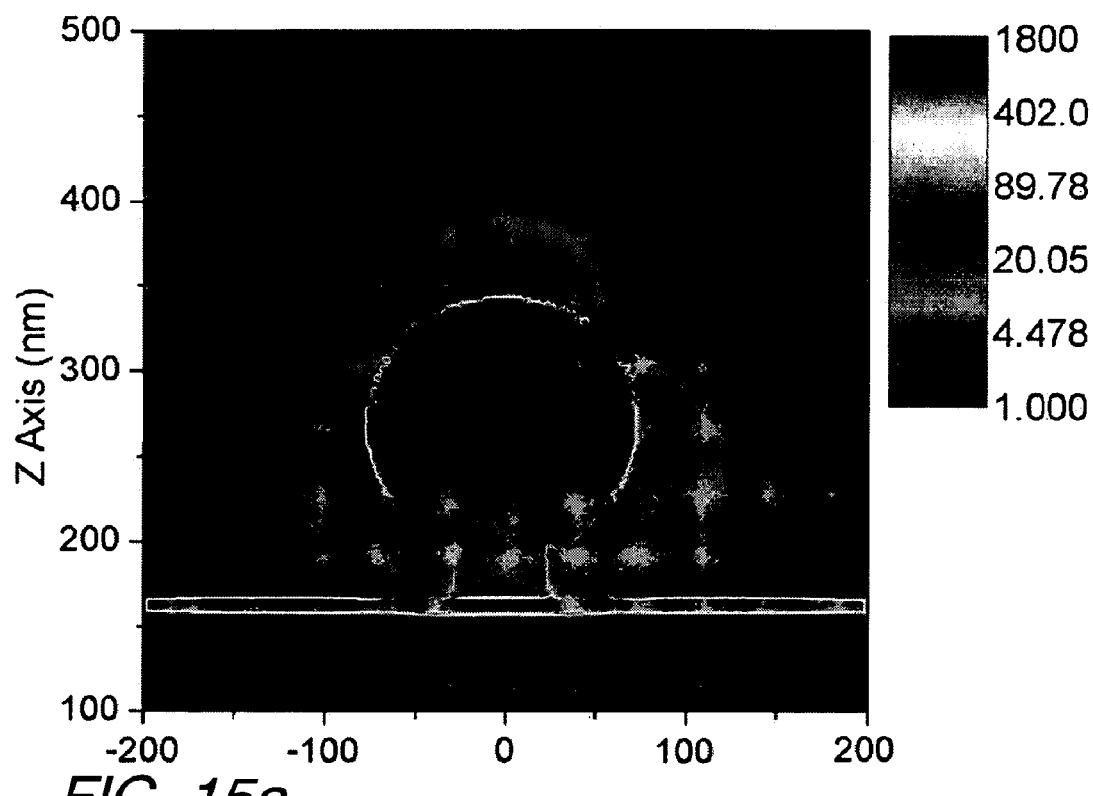
FIGS. 15a, 15b, 15c, 15d, 15e and 15f are graphs of electric field intensity for different transducer thicknesses.
Figure 15B:
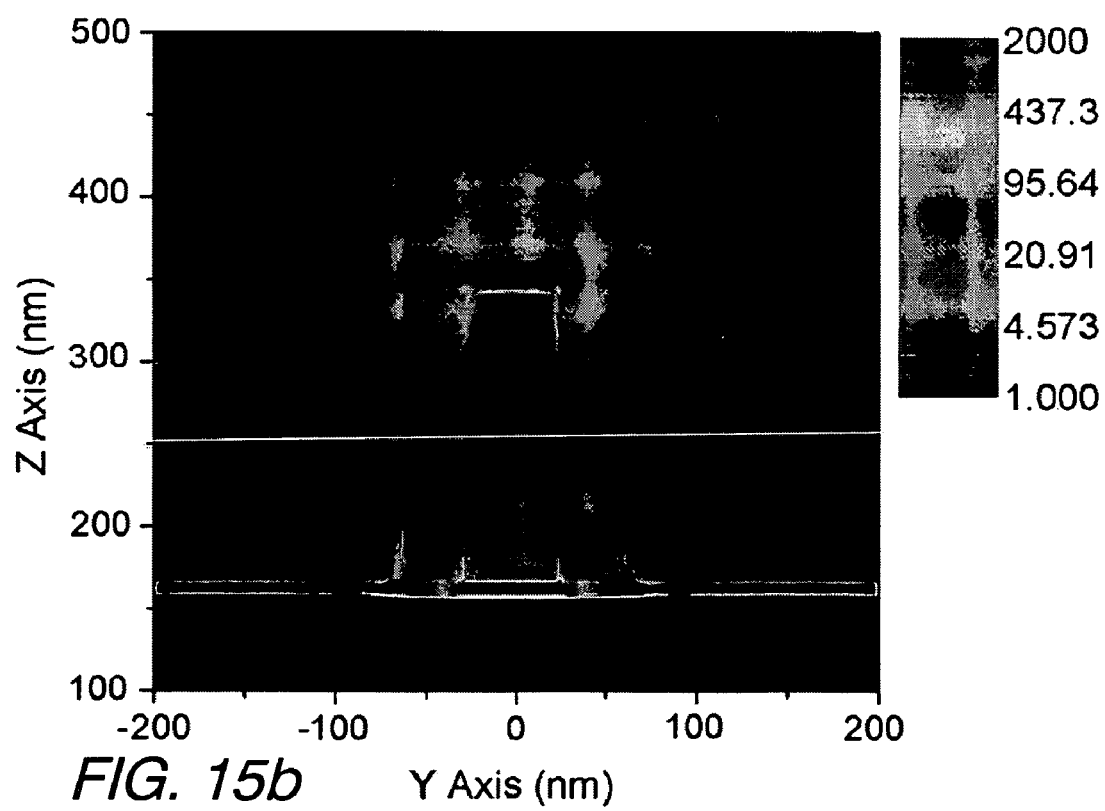
Figure 15C:
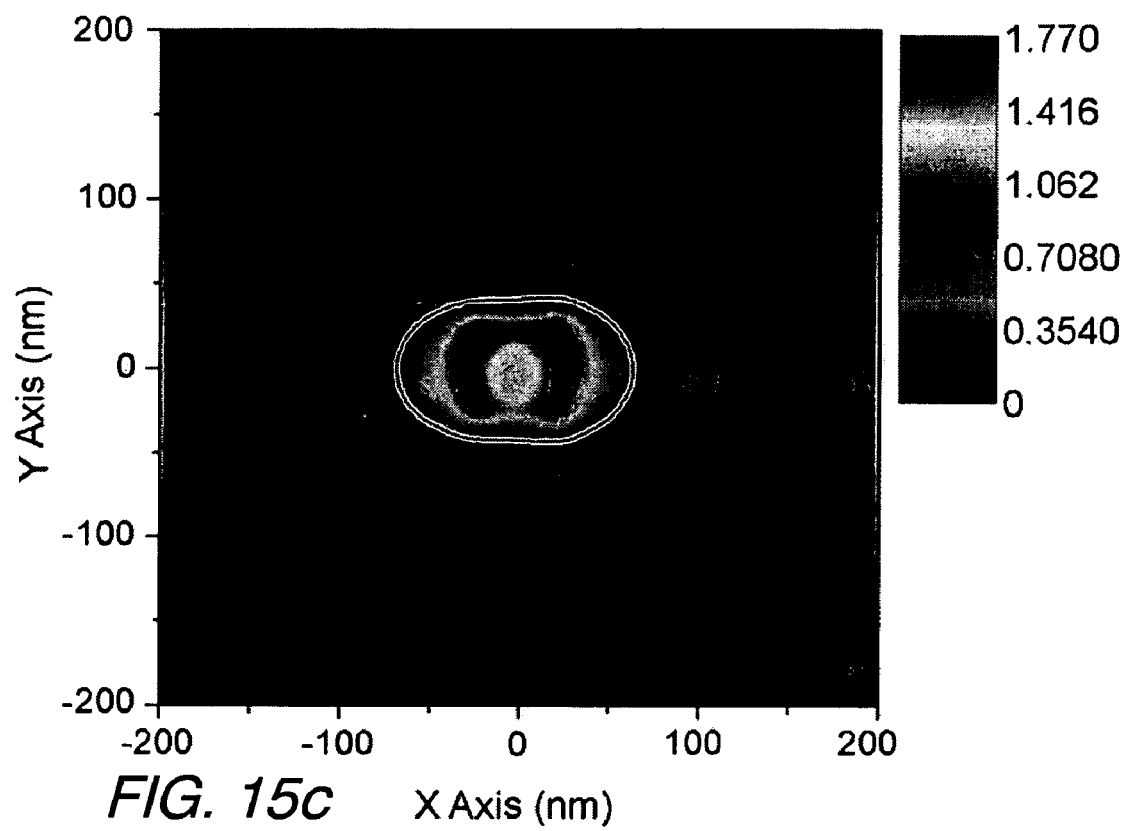

As an example, consider the same waveguide as used previously having a transducer 110 illustrated in FIGS. 14a and 14b, and including a 50 nm thick gold disk 112 and pin 114 for which the disk radius and pin length have been optimized at a wavelength of 830 nm. Using the same geometry except that the disk alone has had its thickness increased to 125 nm, i.e. the thickness of the waveguide, and the disk radius and pin length have again been optimized. If the recording medium in this example is located 10 nm below the transducer, the simulation results are shown in FIGS. 15a to 15f. FIGS. 15a to 15c are field intensity plots for a transducer with a 50 nm disk and pin thicknesses.

Figure 15D:
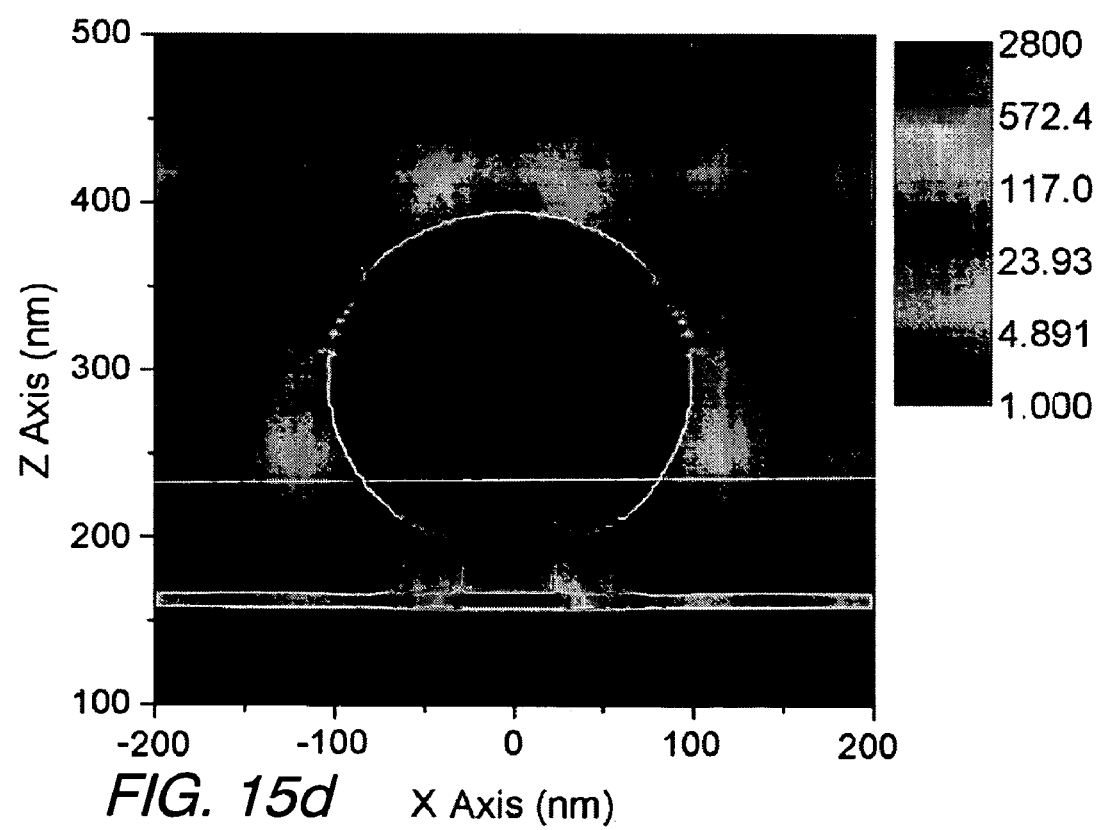
Figure 15E:
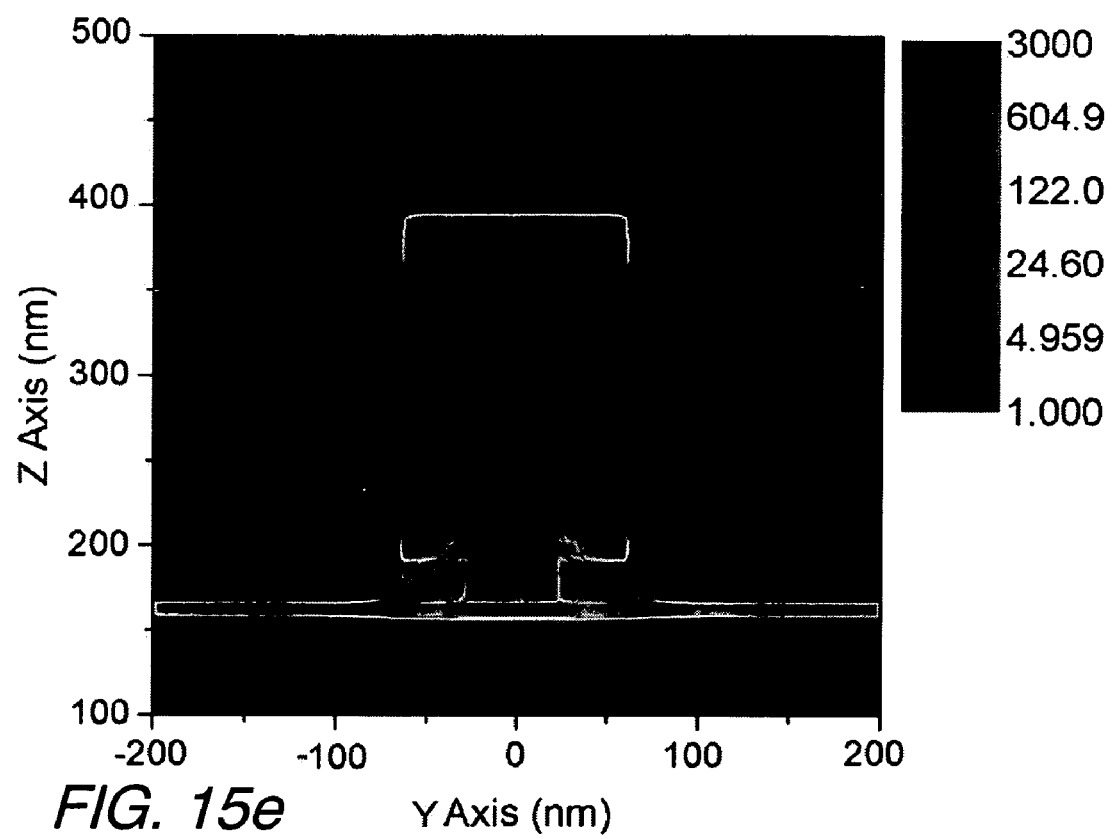
Figure 15F:
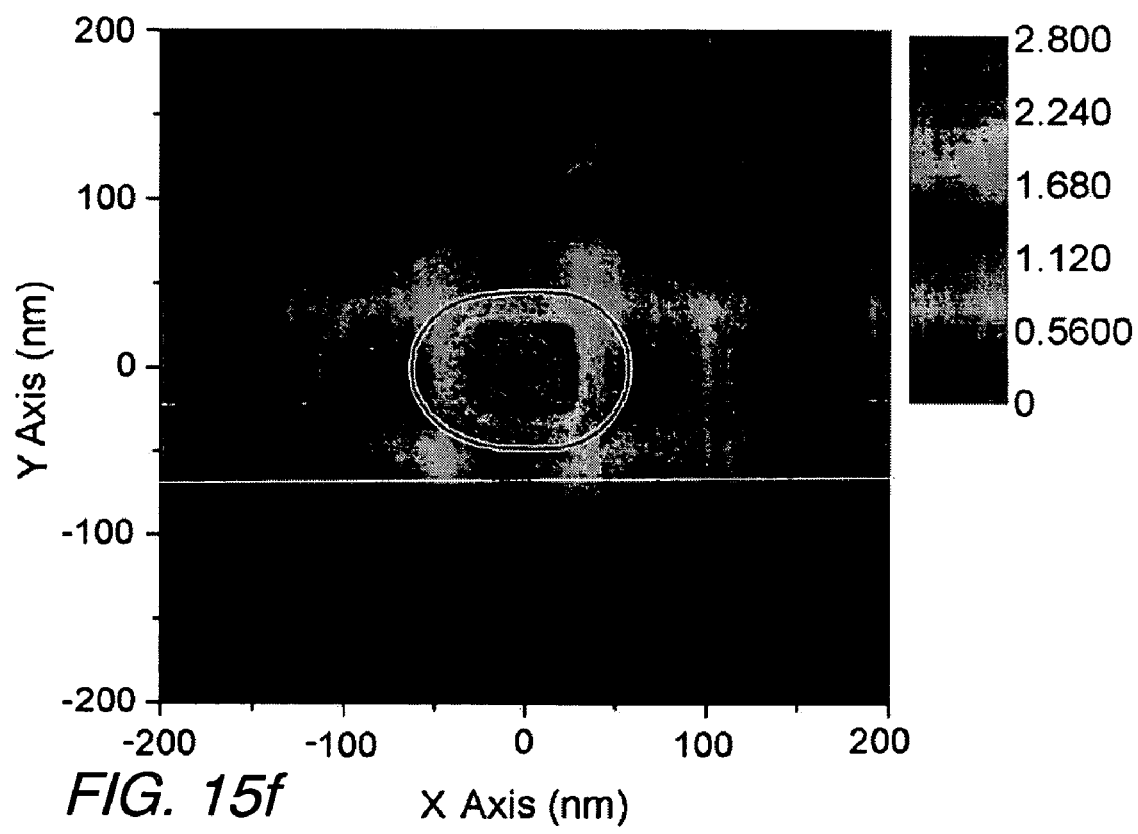

A comparison of FIGS. 15c to 15f indicates that the thicker disk enhances the field intensity in the recording medium by >50%. The disk diameter was assumed to be 150 nm and the pin length was assumed to be 100 nm. FIGS. 15d to 15f are the field intensity plots for a transducer with 125 nm disk and 50 nm pin thicknesses. The disk diameter is 200 nm and the pin length is 125 nm.

Figure 16A:
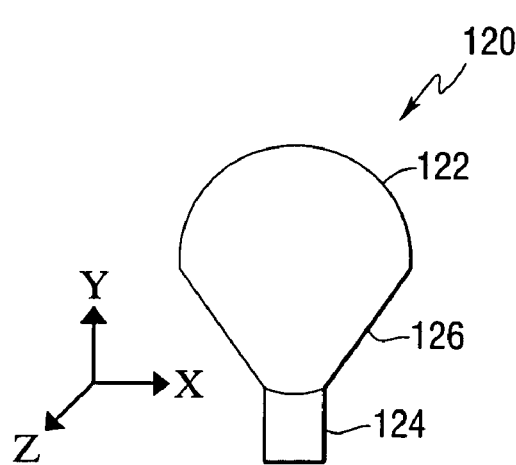
FIGS. 16a and 16b are schematic representations of other transducers constructed in accordance with this invention.
Figure 16B:
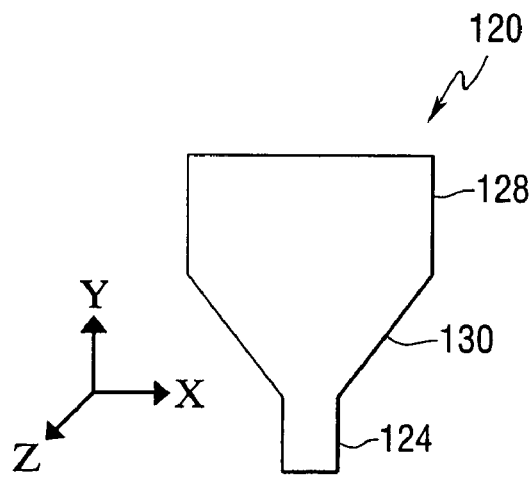

Another modification that might be found useful is shown in FIGS. 16a and 16b. The transducer 120 of FIG. 16a includes a first section 122 having a rounded or semicircular portion and a section 124 in the form of a pin. The first and second sections are connected by a transition section 126. In this case the disk itself is tapered. This removes the metal in the disk that is the closest to the recording medium and which may tend to generate some of the field which is present in the medium as can be seen in FIGS. 15a and 15d. By removing this metal, this helps to further reduce the spot size in the recording medium. FIG. 16b is similar to FIG. 16a, except that the semicircular section is replaced with a rectangular section 126 that may be simpler to fabricate using standard lithographic techniques.

Of course, specific dimensions for a transducer can be optimized for the chosen materials and chosen wavelength. The parameters chosen for these calculations are based on standard tabulated values for optical constants in the literature, but it is well-known that various thin film deposition conditions can substantially alter the actual refractive indices and morphology of the deposited films, which in turn will modify the required dimensions for optimum coupling efficiency.

Figure 17:
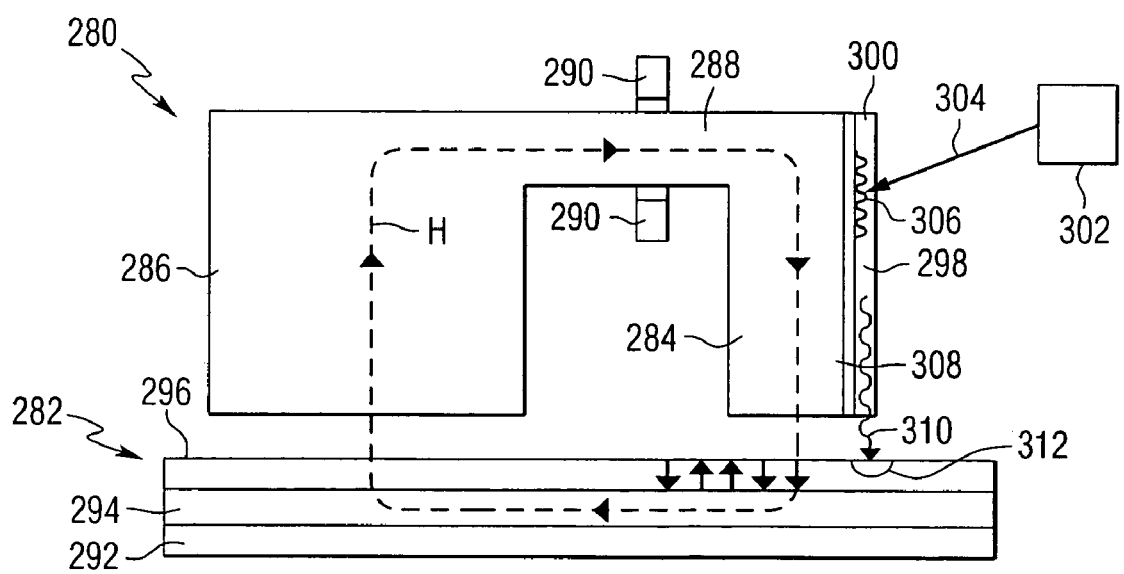
FIG. 17 is a schematic representation of a recording head that includes a transducer constructed in accordance with this invention.

FIG. 17 is a schematic representation of a recording head that includes a transducer constructed in accordance with this invention. FIG. 17 is a partially schematic side view of a heat assisted magnetic recording head 280 and a magnetic recording medium 282. Although an embodiment of the invention is described herein with reference to recording head 280 as a perpendicular magnetic recording head and the medium 282 as a perpendicular magnetic recording medium, it will be appreciated that aspects of the invention may also be used in conjunction with other types of recording heads and/or recording mediums where it may be desirable to employ heat assisted recording. Specifically, the recording head 280 may include a writer section comprising a main write pole 284 and a return or opposing pole 286 that are magnetically coupled by a yoke or pedestal 288. It will be appreciated that the recording head 280 may be constructed with a write pole 284 only and no return pole 286 or yoke 288. A magnetization coil 290 surrounds the yoke or pedestal 288 for energizing the recording head 280. The recording head 280 also may include a read head, not shown, which may be any conventional type of read head as is generally known in the art. The waveguide can alternatively be positioned on the other side of the pole.

Still referring to FIG. 17, the recording medium 282 is positioned adjacent to or under the recording head 280. The recording medium 282 includes a substrate 292, which may be made of any suitable material such as ceramic glass or amorphous glass. A soft magnetic underlayer 294 may be deposited on the substrate 292. The soft magnetic underlayer 294 may be made of any suitable material such as, for example, alloys or multilayers having Co, Fe, Ni, Pd, Pt or Ru. A hard magnetic recording layer 296 is deposited on the soft underlayer 294, with the perpendicular oriented magnetic domains contained in the hard layer 296. Suitable hard magnetic materials for the hard magnetic recording layer 296 may include at least one material selected from, for example, FePt or CoCrPt alloys having a relatively high anisotropy at ambient temperature.

The recording head 280 also includes a planar waveguide 298 that directs light received from a light source onto a surface of a recording medium to heat the magnetic recording medium 282 proximate to where the write pole 284 applies the magnetic write field H to the recording medium 282. The planar waveguide includes a light transmitting layer 300. The optical waveguide 298 acts in association with a light source 302 which transmits light, for example via an optical fiber 304, that is coupled to the optical waveguide 298, by a coupling means such as a grating 306. The light source 302 may be, for example, a laser diode, or other suitable laser light sources. This provides for the generation of a guided mode that may propagate through the optical waveguide 298 toward the recording medium. EM radiation, generally designated by reference number 310, is transmitted from the waveguide 298 for heating the recording medium 282, and particularly for heating a localized area 312 of the recording layer 296.

Figure 18:
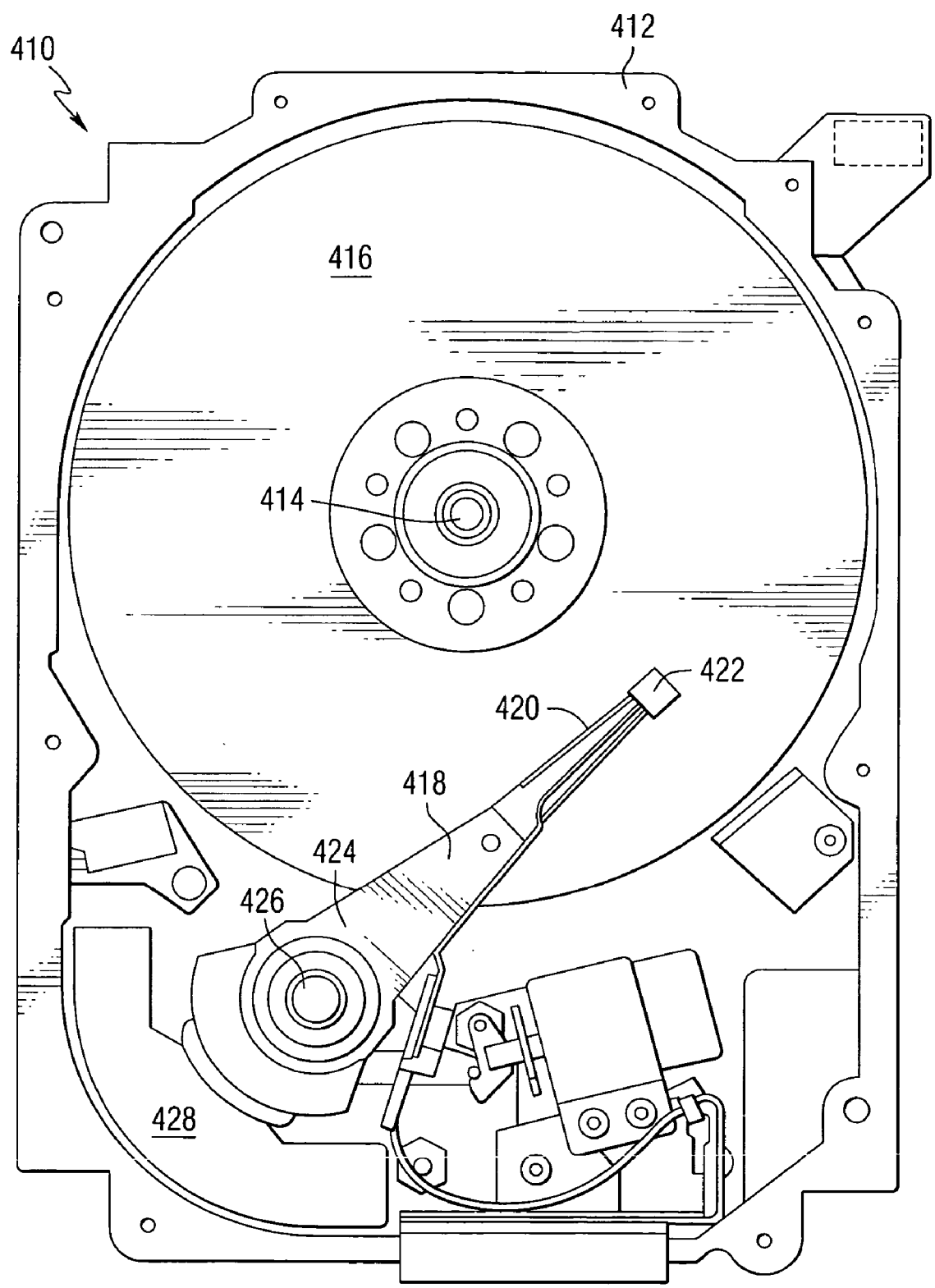
FIG. 18 is a pictorial representation of a disc drive that includes a transducer constructed in accordance with this invention.

This invention also encompasses devices that can be used in magnetic and optical recording heads for use with magnetic and/or optical recording media, as well as magnetic and/or optical recording heads that include such devices and disc drives that include the recording heads. FIG. 18 is a pictorial representation of a disc drive 410 that includes a transducer constructed in accordance with this invention. The disc drive includes a housing 412 (with the upper portion removed and the lower portion visible in this view) sized and configured to contain the various components of the disc drive. The disc drive includes a spindle motor 414 for rotating at least one data storage medium 416 within the housing, in this case a magnetic disc. At least one arm 418 is contained within the housing 412, with each arm 418 having a first end 420 with a recording and/or reading head or slider 422, and a second end 424 pivotally mounted on a shaft by a bearing 426. An actuator motor 428 is located at the arm's second end 424, for pivoting the arm 418 to position the head 422 over a desired sector of the disc 416. The actuator motor 428 is regulated by a controller that is not shown in this view and is well-known in the art.

The waveguides of this invention can also be used in optical recording applications in which either a magnetic field is not needed, such as write once and phase change recording, or where an external magnet could be positioned below the substrate, such as in magneto-optic recording. Alternatively, these structures could potentially be useful in a probe storage application or in other applications where it is desirable to subject a small area to electromagnetic radiation.

While this invention has been described in terms of several examples, it will be apparent to those skilled in the art that various changes can be made to the disclosed examples without departing from the scope of the invention as set forth in the following claims.

What is claimed is:

1. An apparatus comprising:
   a metallic transducer including a first section and a second section, wherein the first section is wider than the second section and has a width to length aspect ratio greater than or equal to a width to length aspect ratio of the second section; and
   a condenser for directing electromagnetic radiation onto the transducer.

2. The apparatus of claim 1, wherein the first section has a spheroidal or disk shape.

3. The apparatus of claim 2, wherein the spheroidal shape comprises one of:
   a sphere, a prolate spheroid, an oblate spheroid, or an ellipsoid.

4. The apparatus of claim 2, wherein the disk shape comprises one of:
   a circular disk or an elliptical disk.

5. The apparatus of claim 1, further comprising:
   a transition section between the first and second sections.

6. The apparatus of claim 5, wherein the transition section comprises:
   a conical section or a tapered section.

7. The apparatus of claim 1, wherein the second section is tapered.

8. The apparatus of claim 1, wherein the condenser comprises one of:
   a planar waveguide or a three-dimensional waveguide.

9. The apparatus of claim 1, wherein the first section has a larger length and width than the second section.

10. The apparatus of claim 1, wherein the first section has a rectangular cross-section.

11. A magnetic storage apparatus comprising:
    a magnetic storage medium;
    an arm for positioning a magnetic recording head adjacent to the magnetic storage medium; and
    an apparatus mounted adjacent to the magnetic recording head, the apparatus comprising a metallic transducer including a first section and a second section, wherein the first section is wider than the second section and has a width to length aspect ratio greater than or equal to a width to length aspect ratio of the second section, and a condenser for directing electromagnetic radiation onto the transducer, wherein the second section is positioned proximate to the storage medium.

12. The magnetic storage apparatus of claim 11, wherein the first section has a spheroidal or disk shape.

13. The magnetic storage apparatus of claim 12, wherein the spheroidal shape comprises one of:
    a sphere, a prolate spheroid, an oblate spheroid, or an ellipsoid.

14. The magnetic storage apparatus of claim 12, wherein the disk shape comprises one of:
    a circular disk or an elliptical disk.

15. The magnetic storage apparatus of claim 11, further comprising:
    a transition section between the first and second sections.

16. The magnetic storage apparatus of claim 15, wherein the transition section comprises:
    a conical section or a tapered section.

17. The magnetic storage apparatus of claim 11, wherein the second section is tapered.

18. The magnetic storage apparatus of claim 11, wherein the condenser comprises one of:
    a planar waveguide or a three-dimensional waveguide.

19. The magnetic storage apparatus of claim 11, wherein the first section has a larger length and width than the second section.

20. The magnetic storage apparatus of claim 11, wherein the first section has a rectangular cross-section.

* * * * *

UNITED STATES PATENT AND TRADEMARK OFFICE
CERTIFICATE OF CORRECTION

PATENT NO. : 7,272,079 B2
APPLICATION NO. : 10/874457
DATED : September 18, 2007
INVENTOR(S) : William Albert Challener It is certified that error appears in the above-identified patent and that said Letters Patent is hereby corrected as shown below:

Title Page item 56 should read
B.D. Terris et al., "Near-Field Optical Data Storage Using A Solid Immersion Lens,"
Appl. Phys. [lett,] Lett, vol. 65, No. 4, Jul. 25, 1994, pp. 388-390.

Signed and Sealed this

Eighteenth Day of December, 2007

JON W. DUDAS
*Director of the United States Patent and Trademark Office*